April 13, 1954  R. E. BLETCHER ET AL  2,675,218
WATER AERATOR
Filed Feb. 23, 1950
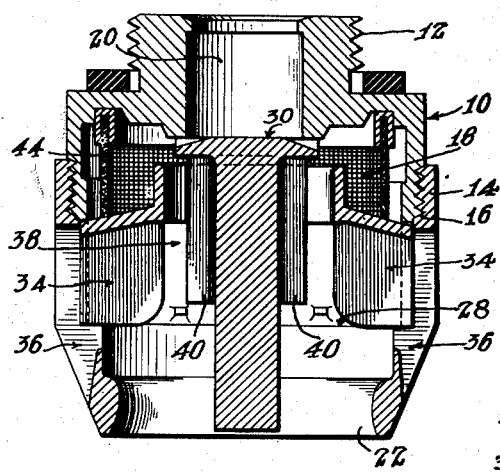
Fig.1
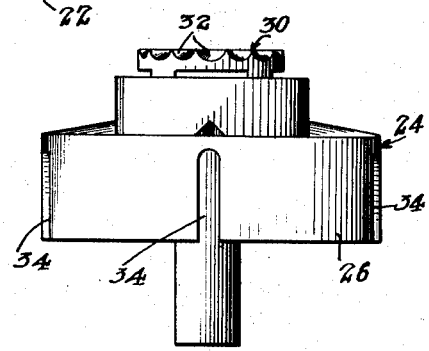
Fig.3
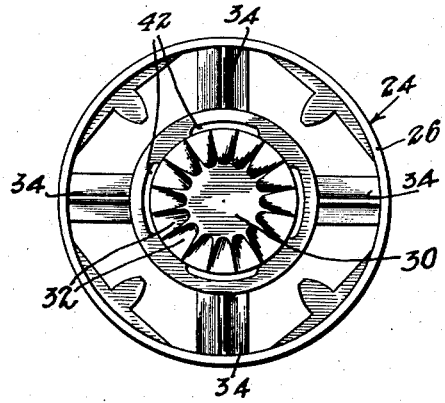
Fig.2
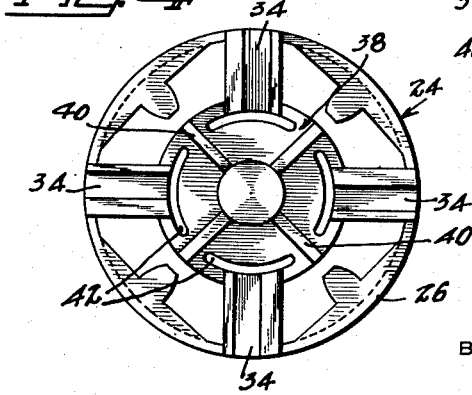
Fig.4
Fig.5
INVENTORS
Ralph E. Bletcher
Irving A. Ward
BY Lyon & Lyon
ATTORNEYS.

Patented Apr. 13, 1954

2,675,218

UNITED STATES PATENT OFFICE 2,675,218

WATER AERATOR

Ralph E. Bletcher and Irving A. Ward, Los Angeles, Calif., assignors of ten per cent to Ralph E. Bletcher, twelve and one-half per cent to Ernest H. Bucknell, twelve and one-half per cent to Mabel Bucknell, ten per cent to Pearl White Bletcher, twenty-five per cent to Marcia Bucknell Liston, ten per cent to James H. Bletcher, ten per cent to Hazel Bletcher Skinner, and ten per cent to Charlotte R. B. Robertson Application February 23, 1950, Serial No. 145,856

10 Claims. (Cl. 261—76)

This invention relates to a new and improved device for mixing a gas, such as air, with a liquid, such as water.

It has been found that if a solid stream of water strikes a solid surface, considerable splashing will result. This splashing can be substantially eliminated by reducing the velocity of the water, finely dividing the stream of water and thoroughly mixing air with the water. It is therefore an object of this invention to provide a device which will efficiently accomplish these functions.

It is frequently desirable to be able to adjust the degree of aeration of the water and, correspondingly, the velocity of the water leaving the aerator. It is a further object of this invention to provide an aerator in which these functions can be effectively controlled.

It is a further object of this invention to provide an aerator wherein foreign matter, such as sand or the like, can be flushed without removing or dismantling the aerator.

The aerating device embodying this invention preferably includes a housing providing a mixing chamber into which water is passed onto water dispersing means which diverts the flow of water past an air ejector means drawing air into the mixing chamber, where the outlet from the chamber is provided with means for mixing the air into the water, and which also functions to finely divide the stream of water and reduce the velocity of the water leaving the aerator.

In accordance with this invention, the elements are so combined as to provide a structure which is self flushing and in which it is possible to adjust the degree of aeration of the water and, correspondingly, the velocity of the water leaving the aerator.

Still further objects and advantages of this invention will be readily apparent from the following specification and the appended drawings.

In the accompanying drawings wherein like numerals designate the same parts:

Figure 1 is a sectional view of an aerator embodying this invention adapted to be engaged to an ordinary household fixture.

Figure 2 is a plan view of the upper side of the deflecting member.

Figure 3 is a side view of the deflecting member.

Figure 4 is a plan view of the underside of the deflecting member.

Figure 5 is a sectional view of a modification of this invention.

The housing providing a mixing chamber may be constructed, as is shown in the drawings illustrating a preferred embodiment of this invention, of a casing 10, provided with a threaded stud 12 adapting the aerator to be attached to a source of liquid under pressure, and a hollow cap 14 which is secured to said casing by any suitable means, such as threads 16. The mixing chamber 18, formed within the casing 10 and the cap 14, is provided with an inlet 20 through the casing 10 through which water enters the mixing chamber and a discharge 22 from the aerator.

The water dispersing means, generally designated 24, is preferably constructed as illustrated in Figure 3. The circular base 26 of the dispersing means is slidably retained within the mixing chamber 18 by the annular ridge 28 of the cap 14.

Rigidly attached to the circular base 26, as hereinafter will be described, is the mushroom 30 which is positioned directly below the inlet 20 when the water dispersing means is inserted in the mixing chamber. This mushroom functions to divert the incoming water radially upon the walls of the mixing chamber 18.

It will be noted that by tightening and loosening the cap 14 the mushroom 30 may be raised and lowered since the dispersing means 24 is retained by the annular ridge 28 in said cap. The ability to raise and lower the mushroom permits effective control of the velocity and degree of dispersion of the incoming water and also the degree of aeration as hereinafter described.

The upper surface of the mushroom 30 may be provided with a plurality of grooves 32 so that water will still pass through the aerator when the cap is sufficiently tightened to hold the mushroom against the casing 10.

When the cap 14 is loosened so that a considerable gap occurs between the mushroom 30 and the casing 10 the radial deflection of the incoming water is reduced to a minimum. A large volume of water under these conditions may be admitted to flush out the aerator carrying with it any foreign matter which may have been trapped in the aerator.

The air ejector means in this particular embodiment of our invention is formed integral with the water dispersing means. A plurality of U-shaped channel members 34 is provided forming passages or vents communicating with the openings 36 in the housing to permit air to enter the mixing chamber 18. The air then passes into a cylindrical air column 38 which is rigidly attached to the vents 34. The fins 40, mounted in said air column, then divert the air upwardly where it is drawn out through the openings 42 in the air column by the water radially deflected by the mushroom 30, which is rigidly mounted on top of said air column.

The means for mixing the air drawn into the mixing chamber by the radially deflected water may be in the form of a screen 44, which is mounted in any suitable manner around the inner wall of the casing 10 opposite the mushroom 30 so that the water deflected radially by the mushroom will strike said screen. When this radially deflected water strikes the screen it is thoroughly mixed with the entrapped air drawn in through the air ejector means and finely divided. A large portion of the kinetic energy of the water is absorbed in this operation, thus substantially reducing the velocity of the water discharged from the aerator.

Figure 5 illustrates a modification of this invention in which like parts serving the same function will be given the same numerical designation with the addition of the exponent "a."

It is readily apparent that the only difference between this modification and the preferred embodiment is in the elimination of the casing 10. In this modification the cap 14a threadably engages the source of water under pressure, such as the spout 46 of a common kitchen fixture, which in turn is provided with a restricted throat 48 directly above the mushroom. In all other respects the construction and operation of the modification is identical to the preferred embodiment.

The operation of the aerator is as follows:

Water is admitted through the inlet 20 from a source of water under pressure (not shown). The water then strikes the mushroom 30 and is laterally deflected onto the screen 44. Here the stream of water is finely broken up and mixed with the air that is drawn through the openings 42 by the laterally deflected water. This air is provided through the openings 36 of the cap 14. From here the air passes through the vents 34 of the dispersing means into the air column 38. From said air column 38 the air is drawn through the openings 42 into the mixing chamber 18 by the stream of water deflected by the mushroom 30 onto the screen 44.

Upon striking the screen 44 the stream of water is finely divided and thoroughly mixed with air. The water and entrapped air then pass between the U-shaped vents 34 of the dispersing means 24 and out the discharge 22, forming a stream or jet of highly aerated water.

When the cap 14 is screwed on tightly, the mushroom 30 contacts the casing 10. The water is forced through the grooves 32, imparting a high velocity to the water which carries with it a large amount of air relative to the volume of the water. This results in a stream or jet of water being discharged through the discharge 22, which has a very high air content and relatively low velocity, and, consequently, results in little or no splash when the water strikes a solid surface.

When it is desired to fill a receptacle with water it is a long and tedious task when the stream of water has a very large amount of air entrapped in it. It is possible in this device to control the amount of air entrapped relative to the volume of water discharged.

When the cap 14 is partially unscrewed the dispersing means 24, being supported upon the ridge 28, is moved vertically downward. The distance between the mushroom 30 and the casing 10 is thereby effectively controlled by raising and lowering the cap 14 and the dispersing means 24. The greater the distance between the mushroom 30 and the casing 10, the smaller the amount of air carried off by the water is relative to the volume of water deflected onto the screen and the greater the velocity of the stream discharged from the aerator. Thus the density and velocity of the stream or jet of water discharged can be controlled by positioning of the cap 14. In filling a receptacle of water it is possible to lower the cap and thereby reduce the amount of air entrapped in the water and increase the velocity of the stream of water discharged and thereby expedite the filling process.

It is not uncommon for sand or other foreign matter to be carried into the aerator by the water or other liquid under pressure. It is a simple matter, utilizing the device herein described, to flush out such foreign matter whether it is trapped between the mushroom 30 and the casing 10 or on the screen 44. The cap 14 is unscrewed sufficiently to lower the mushroom 30 a substantial distance from the casing 10 and permit a large volume of water into the aerator to flush it out.

Thus, by screwing and unscrewing the cap 14, thereby positioning the mushroom 30, it is possible to vary the density and the velocity of the stream of water discharged from the aerator from a high air content and relatively slow moving stream to a very low air content and relatively rapid stream, depending upon the result desired.

It is to be understood that various changes in the shape, size and location of the various parts of the device can be made without departing from the spirit of this invention and the scope of the following claims.

We claim:

1. An aerator comprising: coupling means provided with an inlet; a vertically adjustable cap provided with a discharge opening and defining a mixing chamber with said coupling means; radial dispersing means disposed in said mixing chamber immediately below said inlet and vertically adjustable with said cap; means for admitting air to said mixing chamber; and means for finely dividing liquid and mixing air with liquid disposed in said mixing chamber.

2. An aerator comprising: coupling means provided with an inlet; a vertically adjustable cap provided with a discharge opening and defining a mixing chamber with said coupling means; radial dispersing means disposed in said mixing chamber immediately below said inlet and vertically adjustable with said cap; air induction means disposed in said mixing chamber and admitting air to said mixing chamber below said radial dispersing means; and means for finely dividing liquid and mixing air with liquid disposed in said housing.

3. An aerator comprising: coupling means provided with an inlet; a vertically adjustable cap provided with a discharge opening and defining a mixing chamber with said coupling means; radial dispersing means disposed in said mixing chamber immediately below said inlet and vertically adjustable with said cap; means forming an air column disposed below said radial dispersing means and provided with openings immediately below said dispersing means; means forming a vent to the atmosphere to said air column; and means for finely dividing liquid and mixing air with liquid disposed in said housing.

4. In a device of the class described, the combination of: coupling means provided with an inlet and adapted to be attached to a source of liquid under pressure; a vertically adjustable cap provided with a discharge opening and defining in cooperation with said coupling means a mixing chamber; radial dispersing means disposed in said mixing chamber immediately below said inlet and vertically adjustable with said cap; means for admitting air into said mixing chamber immediately below said dispersing means; and a screen for finely dividing liquid and mixing air with liquid disposed in said mixing chamber surrounding said dispersing means.

5. In a device of the class described, the combination of: coupling means provided with an inlet and adapted to be attached to a source of liquid under pressure; a vertically adjustable cap provided with a discharge opening and defining in cooperation with said coupling means a mixing chamber; a radial dispersing member disposed in said mixing chamber immediately below said inlet, vertically adjustable with said cap and provided with a plurality of grooves thereby permitting flow into said mixing chamber when said dispersing member bears against said coupling means; and means for finely dividing liquid disposed in said mixing chamber and means admitting air to said mixing chamber.

6. In a device of the class described, the combination of: a housing defining a mixing chamber and provided with an inlet and a discharge opening; radial dispersing means disposed in said housing immediately below said inlet; means admitting air to said mixing chamber immediately below said dispersing means; means for vertically adjusting said radial dispersing means with respect to said inlet; and means for finely dividing liquid disposed in said mixing chamber, said radial dispersing means diverting flow from said inlet onto said dividing means.

7. In a device of the class described, the combination of: a housing defining a mixing chamber and provided with an inlet and a discharge opening; radial dispersing means disposed in said housing immediately below said inlet; means for vertically adjusting said radial dispersing means with respect to said inlet; means for admitting air to said mixing chamber; and means for finely dividing liquid and mixing air with liquid disposed in said mixing chamber.

8. In an aerator of the type provided with a housing and a water inlet, the combination of: a deflecting member, conduit means for enclosing an air column secured to and disposed below said deflecting member and provided with openings below said deflecting member, a base adapted to be retained in said housing for supporting said conduit means and deflector member, and means forming vents to said conduit means and securing said conduit means to said base.

9. In an aerator of the type provided with a housing and a water inlet, the combination of: a conduit means for enclosing an air column, vent means for admitting air to said conduit, a deflector member secured to and disposed above said conduit means to radially deflect water admitted through said inlet, and a base member adapted to be retained in said housing for supporting said conduit means and deflector member within said housing.

10. A water aerator comprising: a housing having a water inlet therein directing flow along a path through said housing, water dividing means outside the normal path of flow through said housing, means for admitting air into said housing, and deflecting means in said housing, said deflecting means being movable to a first position deflecting water out of its normal path of flow through said housing onto said water dividing means and then back to its normal flow path whereby water flowing through said housing is aerated, said deflecting means being further movable to a second position where said water is deflected through a smaller angle from its normal path of flow through said housing for varying the degree of aeration of such water.

References Cited in the file of this patent

UNITED STATES PATENTS

| Number | Name | Date |
|---|---|---|
| 1,027,321 | Cleveland | May 21, 1912 |
| 1,328,204 | Sanford | Jan. 13, 1920 |
| 2,140,517 | Dawson | Dec. 20, 1938 |
| 2,176,579 | Buttner | Oct. 17, 1939 |
| 2,210,846 | Aghnides | Aug. 6, 1940 |
| 2,316,832 | Aghnides | Apr. 20, 1943 |
| 2,492,037 | Freeman et al. | Dec. 20, 1949 |
| 2,510,395 | Goodrie | June 6, 1950 |
| 2,510,396 | Goodrie | June 6, 1950 |

FOREIGN PATENTS

| Number | Country | Date |
|---|---|---|
| 323,482 | Great Britain | Jan. 1, 1930 |